US009906430B2

(12) United States Patent
Chen et al.

(10) Patent No.: US 9,906,430 B2
(45) Date of Patent: Feb. 27, 2018

(54) INTERMEDIATE-SYSTEM-TO-INTERMEDIATE-SYSTEM TOPOLOGY-TRANSPARENT-ZONE

(71) Applicant: Futurewei Technologies, Inc., Plano, TX (US)

(72) Inventors: Huaimo Chen, Bolton, MA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 116 days.

(21) Appl. No.: 15/041,770

(22) Filed: Feb. 11, 2016

(65) Prior Publication Data

US 2016/0248659 A1     Aug. 25, 2016

Related U.S. Application Data

(60) Provisional application No. 62/120,793, filed on Feb. 25, 2015.

(51) Int. Cl.
*H04L 12/28* (2006.01)
*H04L 12/751* (2013.01)

(52) U.S. Cl.
CPC .................................. *H04L 45/02* (2013.01)

(58) Field of Classification Search
CPC ....... H04L 45/02; H04L 45/026; H04L 45/04; H04L 45/08; H04L 45/32; H04L 45/54
See application file for complete search history.

(56) References Cited

U.S. PATENT DOCUMENTS

| 9,705,705 B2* | 7/2017 | Xiao .................... H04L 12/4641 |
| 2012/0243443 A1 | 9/2012 | Li et al. |
| 2014/0241372 A1 | 8/2014 | Chen et al. |
| 2014/0254427 A1 | 9/2014 | Chen et al. |

(Continued)

FOREIGN PATENT DOCUMENTS

CN            103959716 A      7/2014

OTHER PUBLICATIONS

Chen, et al., "IS-IS Topology-Transparent Zone," draft-chen-isis-ttz-o3.txt, Oct. 1, 2015, 17 pages.

(Continued)

*Primary Examiner* — Alvin Zhu
(74) *Attorney, Agent, or Firm* — Conley Rose, P.C.

(57) ABSTRACT

A network node comprising a receiver and a processor is disclosed. The receiver is configured to receive an identifier of an intermediate-system-to-intermediate-system (ISIS) topology-transparent-zone (TTZ) to which the network node has been assigned, further configured to receive and store ISIS TTZ topology information, and further configured to receive an indication to distribute topology information related to the ISIS TTZ to other network nodes assigned to the ISIS TTZ. The processor is coupled to the receiver and configured to generate a TTZ-related type-length-value (TLV) and set an indicator in the TTZ-related TLV to indicate that topology information related to the ISIS TTZ is to be distributed, add the TTZ-related TLV to TTZ-related information associated with the network node, and initiate distribution of the TTZ-related information to all TTZ nodes adjacent to the network node.

22 Claims, 8 Drawing Sheets

(56) References Cited

U.S. PATENT DOCUMENTS

2015/0304127 A1* 10/2015 Xiao ............... H04L 12/465
  370/254
2016/0094367 A1* 3/2016 Qu ............... H04L 12/4633
  370/270

OTHER PUBLICATIONS

Oran, Ed., OSI IS-IS Intra-domain Routing Protocol, RFC 112, Feb. 1990, 157 pages.
Callon, "Use of OSI IS-IS for Routing in TCP/IP and Dual Enviomments," RFC 1195, Dec. 1990, 85 pages.
Vasseur, et al., "Definition of an IS-IS Link Attribute Sub-TLV," RFC 5029, Sep. 2007, 6 pages.
Li, et al., "IS-IS Extensions for Traffic Engineering," RFC 5305, Oct. 2008, 18 pages.
Kompella, Ed., et al., "IS-IS Extensions in Support of Generalized Multi-Protocol Label Switching (GMPLS)," RFC 5307, Oct. 2008, 12 pages.
Chen, H., et al., "IS-IS Topology-Transparent Zone," draft-chen-isis-ttz-01.txt, May 4, 2013, 19 pages.
Foreign Communication From a Counterpart Application, PCT Application No. PCT/CN2016/074559, International Search Report dated May 17, 2016, 7 pages.
Foreign Communication From a Counterpart Application, PCT Application No. PCT/CN2016/074559, Written Opinion dated May 17, 2016, 5 pages.
Chen, H., et al., "OSPF Topology-Transparent Zone," XP015104232, draft-ietf-ospf-ttz-00.txt, Jan. 25, 2015, 22 apges.
Foreign Communication From A Counterpart Application, European Application No. 16754771.0, Extended European Search Report dated Dec. 1, 2017, 10 pages.

* cited by examiner

E=1: TTZ edge network node; E=0: TTZ internal network node
T=1: Distributing TTZ topology information for migration
M=1: Migrating to TTZ
N=1: Distributing normal topology information for rollback
R=1: Rolling back from TTZ

INTERMEDIATE-SYSTEM-TO-INTERMEDIATE-SYSTEM TOPOLOGY-TRANSPARENT-ZONE

CROSS-REFERENCE TO RELATED APPLICATIONS

The present application claims benefit of U.S. Provisional Patent Application No. 62/120,793 filed Feb. 25, 2015, by Huaimo Chen, et al., and entitled, "Intermediate-System-To-Intermediate-System Topology-Transparent-Zone," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As Internet traffic continues to grow, the number of network nodes may also increase within a network. To manage the Internet traffic, the network may be extended by splitting the network into a plurality of areas. However, splitting the network may be challenging or may cause resource usage issues, and/or service interruption issues. For instance, dividing a network from one area into multiple areas or from a number of existing areas to more areas may be time consuming and also involve significant network architecture changes. Services carried by a network may also be interrupted while the network is being split into multiple areas. Further, setting up a multi-protocol label switching (MPLS) traffic engineering (TE) label switching path that crosses multiple areas may be complex. In a conventional system, a TE path crossing multiple areas may be computed by using a path computation element (PCE) through the PCE Communication Protocol (PCEP). Such a conventional system may require manual configuration of the sequenced domains and may be difficult to configure by a network operator. Additionally, the conventional system may not guarantee an optimal path and may also require a large number of link states such as link-state advertisements (LSAs) that are distributed among the network nodes, which may cause scalability issues.

SUMMARY

In an embodiment, a method for an edge network node in an intermediate-system-to-intermediate-system (ISIS) topology-transparent-zone (TTZ) is provided. The method comprises receiving an identifier of an ISIS TTZ to which the edge network node has been assigned; receiving and storing ISIS TTZ topology information; receiving a command to distribute the ISIS TTZ topology information to other network nodes assigned to the ISIS TTZ; generating a TTZ-related type-length-value (TLV) and setting an indicator in the TTZ-related TLV to indicate that topology information related to the ISIS TTZ is to be distributed; adding the TTZ-related TLV to a link state protocol data unit (LSP) that is to be transmitted by the edge network node; and distributing the LSP to all TTZ nodes adjacent to the edge network node.

Generating the TTZ-related TLV may comprise generating the TTZ-related TLV to include the identifier of the ISIS TTZ; a first indicator configured to indicate whether a network node is an edge network node or an internal network node; a second indicator configured to indicate whether topology information related to the ISIS TTZ is to be distributed; a third indicator configured to indicate whether migration to the ISIS TTZ is to occur; a fourth indicator configured to indicate whether normal topology information for rollback is to be distributed; a fifth indicator configured to indicate whether rolling back from the ISIS TTZ is occurring; and a sub-TLV field containing information about TTZ nodes adjacent to the edge network node. The sub-TLV field may comprise a TTZ intermediate system network (ISN) sub-TLV containing information related to at least one TTZ node adjacent to the edge network node that is an intermediate system node, and a TTZ end system network (ESN) sub-TLV containing information related to at least one adjacent TTZ node that is an end system node, when the edge network node has at least one adjacent TTZ node that is an end system node. The ISN sub-TLV may comprise an identifier of the at least one TTZ node adjacent to the edge network node that is an intermediate system node, and at least one metric related to the at least one TTZ node adjacent to the edge network node that is an intermediate system node. The ESN sub-TLV may comprise an identifier of the at least one TTZ node adjacent to the edge network node that is an end system node, and at least one metric related to the at least one TTZ node adjacent to the edge network node that is an end system node. The method may further comprise receiving a command to migrate to the ISIS TTZ; setting an indicator in the TTZ-related TLV to indicate that migration to the ISIS TTZ is to occur; and distributing to all TTZ nodes adjacent to the edge network node the LSP with the indicator in the TTZ-related TLV set to indicate that migration to the ISIS TTZ is to occur. Responsive to receiving the command to migrate to the ISIS TTZ, the edge network node may add other edge network nodes assigned to the ISIS TTZ to an Intermediate System Neighbors TLV in the edge network node's LSP, remove from the Intermediate System Neighbors TLV any adjacent node contained in the TTZ ISN sub-TLV, and remove from an End System Neighbors TLV in the edge network node's LSP any adjacent node contained in the TTZ ESN sub-TLV.

In another embodiment, a method for an internal network node in an ISIS TTZ is provided. The method comprises receiving an identifier of an ISIS TTZ to which the internal network node has been assigned; receiving from another node a first LSP with a first TTZ-related TLV containing an indication that topology information related to the ISIS TTZ is to be distributed, wherein the first TTZ-related TLV further contains topology information related to the other node; distributing the first LSP to adjacent TTZ nodes of the internal network node except for the adjacent TTZ node from which the first LSP is received; generating a second LSP and adding a second TTZ-related TLV to the second LSP, wherein the second TTZ-related TLV does not contain topology information related to the internal network node; and distributing the second LSP to all TTZ nodes adjacent to the internal network node.

The second TTZ-related TLV may comprise the identifier of the ISIS TTZ and a first indicator configured to indicate whether a network node is an edge network node or an internal network node. Responsive to receiving the first TTZ-related TLV, the internal network node may set the first indicator in the second TTZ-related TLV to indicate that the internal network node is an internal network node. Setting the first indicator in the second TTZ-related TLV to indicate that the internal network node is an internal network node may further indicate that all circuits connected to the internal network node are TTZ circuits. The method may further comprise receiving from another node a third LSP with an indication that migration to the ISIS TTZ is to occur, and distributing the third LSP to all TTZ nodes adjacent to the internal network node except for the TTZ node from which the third LSP is received. The method may further comprise receiving from another node a fourth LSP generated by a TTZ edge node containing virtual circuits; storing information in the fourth LSP in the internal network node's link state database (LSDB) and setting a flag for each of the virtual circuits to indicate that each of the virtual circuits is unusable for computing a routing table; and distributing the fourth LSP to all TTZ nodes adjacent to the internal network node except for the TTZ node from which the fourth LSP is received. Responsive to receiving the third LSP with the indication that migration to the ISIS TTZ is to occur, the internal network node may compute a routing table using TTZ circuits and normal circuits in the internal network node's LSDB without using the virtual circuits with the flag set to indicate that the virtual circuits are unusable for computing the routing table.

In another embodiment, a network node comprising a receiver and a processor is provided. The receiver is configured to receive an identifier of an ISIS TTZ to which the network node has been assigned, receive and store ISIS TTZ topology information, and receive an indication to distribute the ISIS TTZ topology information to other network nodes assigned to the ISIS TTZ. The processor is coupled to the receiver and configured to generate a TTZ-related TLV and set an indicator in the TTZ-related TLV to indicate that topology information related to the ISIS TTZ is to be distributed, add the TTZ-related TLV to TTZ-related information associated with the network node, and initiate distribution of the TTZ-related information to all TTZ nodes adjacent to the network node. The TTZ-related TLV includes the identifier of the ISIS TTZ; a first indicator configured to indicate whether the network node is an edge network node or an internal network node; a second indicator configured to indicate that topology information related to the ISIS TTZ is to be distributed; a third indicator configured to indicate whether migration to the ISIS TTZ is to occur; a fourth indicator configured to indicate whether normal topology information for rollback is to be distributed; a fifth indicator configured to indicate whether rolling back from the ISIS TTZ is occurring; and a sub-TLV field containing information about at least one TTZ node adjacent to the network node.

The indication to distribute topology information related to the ISIS TTZ may be at least one of a command received by the network node, and reception by the network node of a TTZ-related TLV in an LSP from another node, wherein the received TTZ-related TLV includes the second indicator set to indicate that topology information related to the ISIS TTZ is to be distributed. The TTZ-related information associated with the network node may be at least one of an LSP associated with the network node, and a Hello message transmitted by the network node. The sub-TLV field may include a TTZ ISN sub-TLV containing an identifier of at least one TTZ node adjacent to the network node that is an intermediate system node, and at least one metric related to the at least one TTZ node adjacent to the network node that is an intermediate system node. When the network node has at least one adjacent TTZ node that is an end system node, the sub-TLV field may further include a TTZ ESN sub-TLV containing an identifier of the at least one adjacent TTZ node that is an end system node, and at least one metric related to the at least one adjacent TTZ node that is an end system node. The processor may be further configured to initiate distribution to all TTZ nodes adjacent to the network node of the TTZ-related TLV with the third indicator set to indicate that migration to the ISIS TTZ is to occur.

Another embodiment provides a non-transitory computer-readable medium storing computer instructions for establishing an ISIS TTZ, that when executed by one or more processors, cause the one or more processors to perform the steps of receiving an identifier of an ISIS TTZ to which an edge network node has been assigned; receiving and storing ISIS TTZ topology information; receiving a command to distribute the ISIS TTZ topology information to other network nodes assigned to the ISIS TTZ; generating a TTZ-related TLV and setting an indicator in the TTZ-related TLV to indicate that topology information related to the ISIS TTZ is to be distributed; adding the TTZ-related TLV to an LSP that is to be transmitted by the edge network node; and distributing the LSP to all TTZ nodes adjacent to the edge network node.

Another embodiment provides a non-transitory computer-readable medium storing computer instructions for establishing an ISIS TTZ, that when executed by one or more processors, cause the one or more processors to perform the steps of receiving an identifier of an ISIS TTZ to which an internal network node has been assigned; receiving from another node a first LSP with a first TTZ-related TLV containing an indication that topology information related to the ISIS TTZ is to be distributed, wherein the first TTZ-related TLV further contains topology information related to the other node; distributing the first LSP to adjacent TTZ nodes of the internal network except for the adjacent TTZ node from which the first LSP is received; generating a second LSP and adding a second TTZ-related TLV to the second LSP, wherein the second TTZ-related TLV does not contain topology information related to the internal network node; and distributing the second LSP to all TTZ nodes adjacent to the internal network node.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for constructing and supporting an Intermediate-System-to-Intermediate-System (ISIS) Topology-Transparent-Zone (TTZ). A TTZ comprises a group of routers and a number of circuits connecting the routers. Any router outside of the zone is not aware of the zone. The information about the circuits and routers inside the zone is not distributed to any router outside of the zone. Any link state change such as a circuit failure inside the zone is not seen by any router outside of the zone.

A TTZ may be deployed for resolving some critical issues such as service interruption and scalability in existing networks and future networks. It may be preferable that a TTZ be backward compatible. That is, when a TTZ is deployed on a set of routers in a network, the routers outside of the TTZ in the network do not need to know or support the TTZ. A TTZ may support at least one more level of network hierarchies, in addition to the hierarchies supported by existing routing protocols. Users may be able to easily set up an end-to-end service crossing TTZs. It may be preferable that the configuration for a TTZ in a network and the changes to the existing protocols for supporting a TTZ be kept to a minimum.

A TTZ is identified by an identifier (ID) and includes a group of routers and a number of circuits connecting the routers. A TTZ may be in an ISIS sub domain (area). The ID of a TTZ or the TTZ ID is a number that is unique for identifying an entity such as a node in an ISIS sub domain (area). It is not zero in general. In addition to having the functions of an ISIS level or area, an ISIS TTZ makes some improvements on an ISIS level or area, which include virtualizing an ISIS TTZ as TTZ edge routers connected. An ISIS TTZ may receive the link state information about the topology outside of the TTZ, store the information in the TTZ and flood the information through the TTZ to the routers outside of the TTZ.

Figure 1:
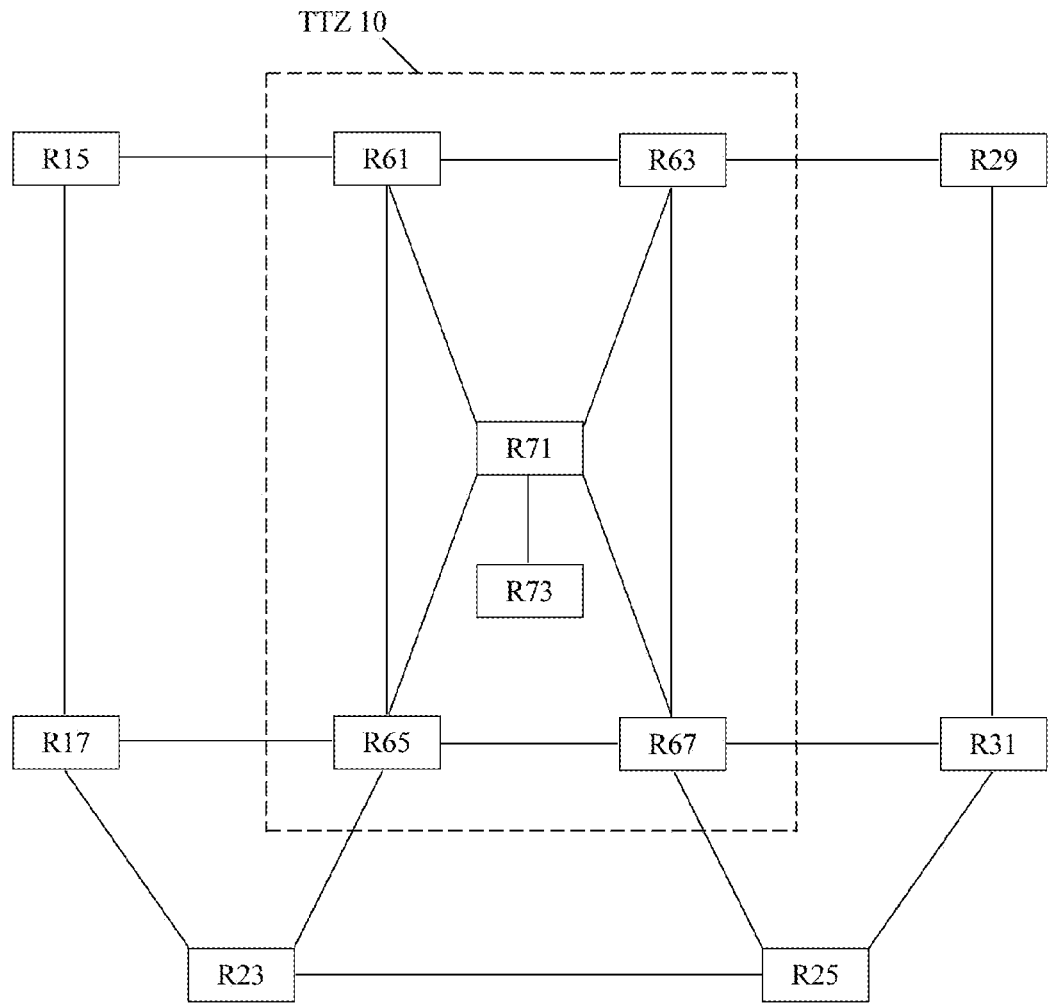
FIG. 1 is a block diagram of an embodiment of a network implementing an ISIS TTZ.

FIG. 1 illustrates an example of a routing domain containing a TTZ 10. The routing domain comprises routers R15, R17, R23, R25, R29 and R31. The routing domain also contains the TTZ 10, which comprises routers R61, R63, R65, R67, R71 and R73, and the circuits connecting them. There are two types of routers in a TTZ: TTZ internal routers and TTZ edge routers. A TTZ internal router is a router inside the TTZ, and its adjacent routers are also inside the TTZ. A TTZ edge router is a router inside the TTZ and is connected to at least one adjacent router that is outside of the TTZ. The TTZ 10 in FIG. 1 comprises four TTZ edge routers, R61, R63, R65 and R67. Each TTZ edge router is connected to at least one router outside of the TTZ 10. For instance, router R61 is a TTZ edge router since it is connected to router R15, which is outside of the TTZ 10. In addition, the TTZ comprises two TTZ internal routers, R71 and R73. A TTZ internal router is not connected to any router outside of the TTZ 10. For instance, router R71 is a TTZ internal router since it is connected only to routers R61, R63, R65, R67 and R73 inside the TTZ 10 and is not connected to any router outside of the TTZ 10. A TTZ may hide the information inside the TTZ from the outside and may not directly distribute any internal information about the TTZ to a router outside of the TTZ. For instance, a router within TTZ 10 in FIG. 1, such as edge routers R61, R63, R65 and R67 may not send information about TTZ internal router R71 or R73 to any router outside of the TTZ 10 in the routing domain and may not send information about the circuit between routers R61 and R65, R61 and R63, R65 and R67, and between routers R63 and R67 to any router outside of the TTZ 10.

In order to create a TTZ, the same TTZ ID may be configured on the TTZ edge routers, and the TTZ internal circuits on the routers may be identified. In addition, the TTZ ID may be configured on every TTZ internal router, which indicates that every circuit of the router is a TTZ internal circuit. To a router outside of a TTZ, the TTZ is seen as a group of routers fully connected. For instance, router R15 in FIG. 1, which is outside of the TTZ 10, sees the TTZ 10 as a group of TTZ edge routers: R61, R63, R65 and R67. These four TTZ edge routers are fully connected. In addition, a router outside of a TTZ sees TTZ edge routers having normal connections to the routers outside of the TTZ. For example, router R15 sees four TTZ edge routers R61, R63, R65 and R67, which have the normal connections to R15, R29, R17 and R23, and R25 and R31, respectively.

Figure 2:
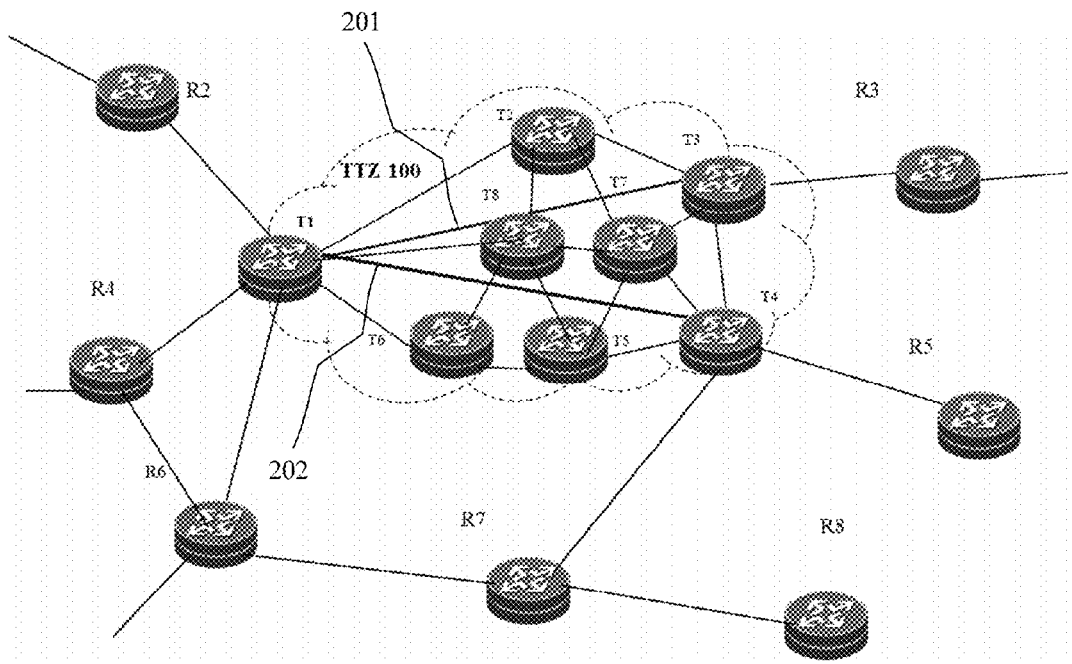
FIG. 2 is a block diagram of an embodiment of another network implementing an ISIS TTZ.

FIG. 2 is an embodiment of another network implementing an ISIS TTZ, which is configured with a TTZ ID of 100. The TTZ 100 is similar to the TTZ 10 of FIG. 1, with the exception that virtual circuits, as described in more detail below, are depicted in the TTZ 100, while virtual circuits are not shown in the TTZ 10. ISIS TTZ 100 comprises TTZ edge network nodes T1, T3 and T4, which may be substantially similar to TTZ edge routers R61, R63, R65 and R67 in FIG. 1. ISIS TTZ 100 further comprises TTZ internal network nodes T2, T5, T6, T7 and T8, which may be substantially similar to TTZ internal routers R71 and R73 in FIG. 1. Network nodes R2-R8 in FIG. 2 are outside of the ISIS TTZ 100 and may be substantially similar to routers R15, R17, R23, R25, R29 and R31 in FIG.1. TTZ network nodes T1-T8 are in data communication with each other via circuits. A virtual circuit between two TTZ edge nodes is a point-to-point circuit whose cost is the cost of a shortest path within the TTZ between these two TTZ edge nodes. Thus, circuit 201 may be a virtual circuit between T1 and T3 with the cost of the shortest path within the TTZ 100 between T1 and T3. Similarly, circuit 202 may be a virtual circuit between T1 and T4 with the cost of the shortest path within the TTZ 100 between T1 and T4. Virtual circuits 201 and 202 may be created after migration to the TTZ 100 is complete, as described in more detail below. Routing information for TTZ internal nodes along a virtual circuit is not shared with network nodes outside of the ISIS TTZ. As such, each virtual circuit appears as a normal point-to-point circuit between two TTZ edge nodes to network nodes outside of the ISIS TTZ.

The embodiments disclosed herein allow a smooth transfer of routers in a routing area of a network and circuits connecting these routers into a virtual entity such as an ISIS TTZ without routing interruptions to the network and with minimum network operation on the network. Further, employing an ISIS TTZ minimizes service interruptions while virtualizing parts of the network in an existing network.

In particular, a new type-length-value (TLV) called the TTZ TLV is defined herein. This new TTZ TLV facilitates a smooth migration to a new TTZ configuration without service interruption. The new TTZ TLV may be added into a link state protocol data unit (LSP) or a Hello protocol data unit (PDU) for a TTZ node. A Hello PDU is also called a Hello message.

Figure 3:
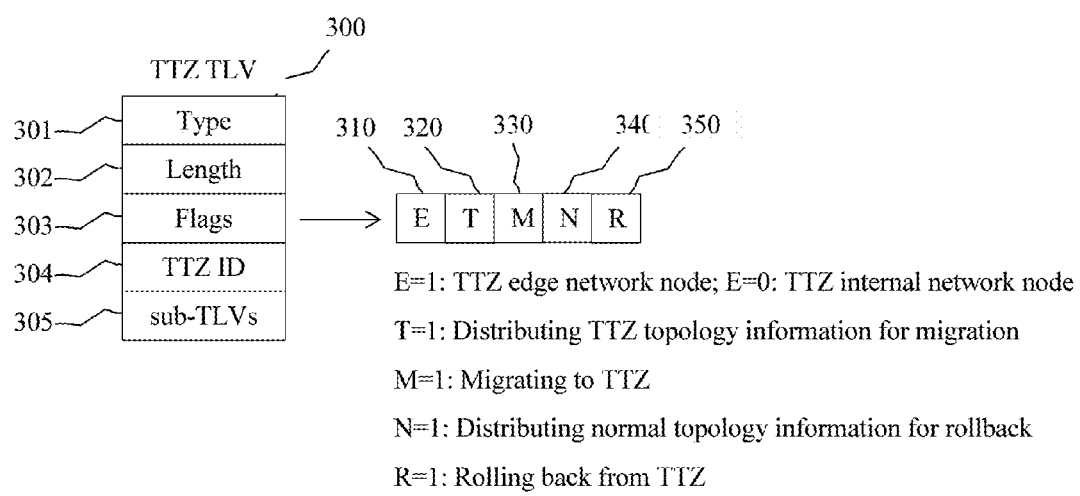
FIG. 3 is a schematic diagram of an embodiment of a TTZ TLV.

FIG. 3 is an embodiment of a TTZ TLV 300 that may be included in an LSP generated by a TTZ node in an ISIS TTZ, such as the TTZ 10 of FIG. 1 or the TTZ 100 of FIG. 2. The TTZ TLV 300 comprises a type field 301, a length field 302, a flags field 303, a TTZ ID field 304, and a sub-TLV field 305. The type field 301 may indicate that the TTZ TLV 300 is associated with an ISIS TTZ. The length field 302 may indicate the length of the TTZ TLV 300. The flags field 303 may comprise a plurality of flags that are used with an ISIS TTZ. For example, the flags field 303 may comprise a first flag 310 that indicates whether a TTZ network node is a TTZ edge network node or a TTZ internal network node, a second flag 320 that indicates that topology information for an ISIS TTZ is being distributed for migration, a third flag 330 that indicates that a TTZ network node is migrating to an ISIS TTZ, a fourth flag 340 that indicates normal topology information is being distributed for a rollback, and a fifth flag 350 that indicates that a TTZ network node is rolling back from an ISIS TTZ. The first flag 310 may be referred to hereinafter as the E flag or the E bit, the second flag 320 may be referred to hereinafter as the T flag or the T bit, the third flag 330 may be referred to hereinafter as the M flag or the M bit, the fourth flag 340 may be referred to hereinafter as the N flag or the N bit, and the fifth flag 350 may be referred to hereinafter as the R flag or the R bit. The TTZ ID field 304 may indicate an identifier of an ISIS TTZ to which the TTZ node belongs. The sub-TLV field 305 may comprise one or more sub-TLVs that are associated with the TTZ node in an ISIS TTZ.

Figure 4:
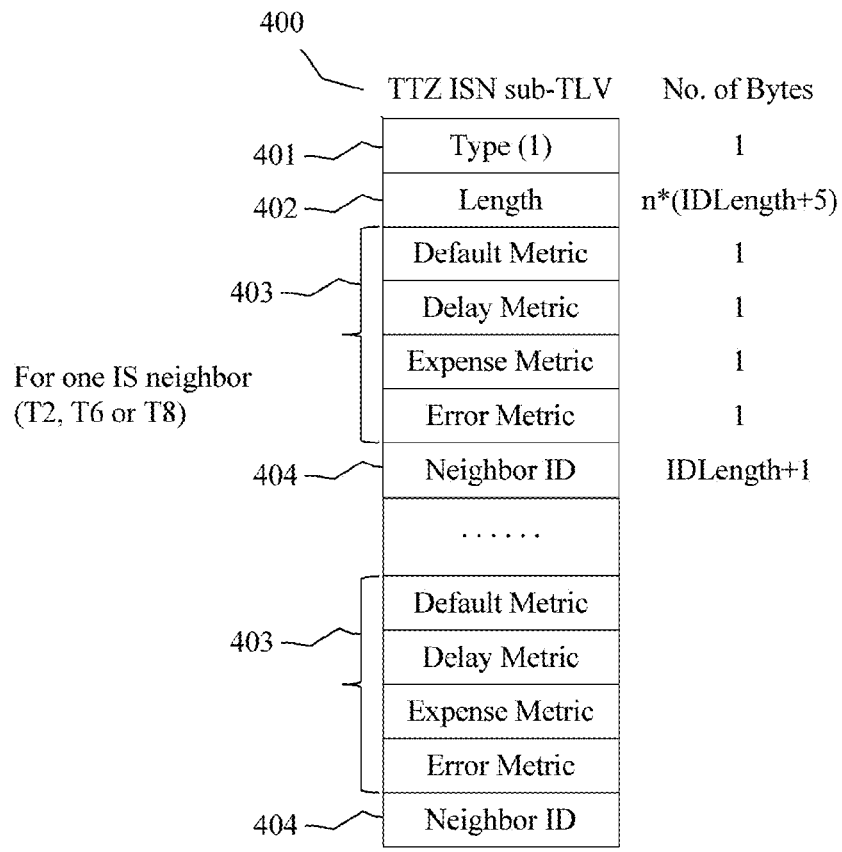
FIG. 4 is a schematic diagram of an embodiment of a sub-TLV for a TTZ intermediate system network node.

FIG. 4 is an embodiment of a sub-TLV 400 that may be included in the sub-TLV field 305 of the TTZ TLV 300 in FIG. 3. The sub-TLV 400 may be associated with a TTZ node generating an LSP with the TTZ TLV containing the sub-TLV 400. The sub-TLV 400 may comprise information about a number of TTZ intermediate system network (ISN) nodes connected to the TTZ node, where an ISN node may be defined as a node that is connected to at least two other nodes. That is, an ISN node is not a "dead-end" node that is connected to only one other node. In FIG. 1, all routers in the TTZ 10 are ISN nodes, except for router R73. The terms "ISN node" and "intermediate system network node" are not synonymous with the term "internal router" as used with regard to FIG. 1 or with the term "internal network node" as used with regard to FIG. 2. The TTZ ISN sub-TLV 400 comprises a type field 401, a length field 402, and a number of metric fields 403 and neighbor ID fields 404. The type field 401 may indicate that the TTZ ISN sub-TLV 400 is for a number of TTZ ISN nodes that are the TTZ node's adjacent TTZ neighbors. The length field 402 may indicate the length of the TTZ ISN sub-TLV 400. Each of the metric fields 403 followed by a neighbor ID field 404 may indicate one or more metrics for a neighbor TTZ ISN node identified by the neighbor ID in the neighbor ID field 404.

Figure 5:
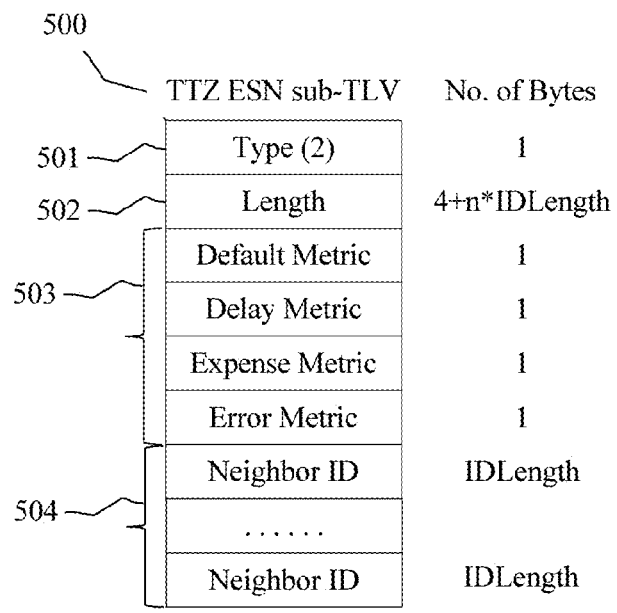
FIG. 5 is a schematic diagram of an embodiment of a sub-TLV for a TTZ end system network node.

FIG. 5 is an embodiment of another sub-TLV 500 that may be included in the sub-TLV field 305 of the TTZ TLV 300 in FIG. 3. The sub-TLV 500 may be associated with a TTZ node generating an LSP with the TTZ TLV containing the sub-TLV 500. The sub-TLV 500 may comprise information about a number of TTZ end system network (ESN) nodes, where an ESN node may be defined as a node that is connected to only one other node. That is, an ESN node may be considered a "dead-end" node. In FIG. 1, router R73 is an ESN node. The terms "ESN node" and "end system network node" are not synonymous with the term "edge router" as used with regard to FIG. 1 or with the term "edge network node" as used with regard to FIG. 2. The TTZ ESN sub-TLV 500 comprises a type field 501, a length field 502, one or more metric fields 503, and one or more neighbor ID fields 504. The type field 501 may indicate that the TTZ ESN sub-TLV 500 is for a TTZ ESN node. The length field 502 may indicate the length of the TTZ ESN sub-TLV 500. The metric fields 503 may indicate one or more metrics for a number of end system neighbors. The neighbor ID fields 504 may identify one or more TTZ internal end system neighbors connected to the TTZ node.

The sub-TLV field 305 for a given node that is connected to a plurality of other nodes will contain an ISN sub-TLV 400 that contains topology information for each of the ISN nodes connected to the given node. If the given node is connected to one or more ESN nodes, the given node's sub-TLV field 305 will contain a TTZ ESN sub-TLV 500 that contains topology information for each of the ESN nodes connected to the given node. If the given node has no connections to ESN nodes, then the sub-TLV field 305 will contain only a TTZ ISN sub-TLV 400 and will not contain a TTZ ESN sub-TLV 500.

In an embodiment, the migration of a group of nodes in a network to a TTZ involves at least three steps: configuration of a TTZ, triggering of distribution of TTZ information, and triggering of migration. The configuration of a TTZ is the assignment of the same TTZ ID to all nodes that are to be included in the TTZ. For example, nodes T1-T8 in FIG. 2 would be given the TTZ ID 100.

Triggering of distribution of TTZ information may also be referred to as preparation for migration. In this step, a command to prepare for migration is issued by a network administrator or a similar entity to one node that is to be included in the TTZ. For example, the command might be issued to T1 in FIG. 2. Responsive to receiving the command, T1 adds a TTZ TLV, such as the TTZ TLV 300 of FIG. 3, to its LSP and sets the T flag 320 to indicate that topology information is being distributed for migration. For instance, the T flag 320 may be set to 1. T1 also adds to the TTZ TLV topology information indicating which TTZ nodes are adjacent to T1. T1 then sends the LSP containing the TTZ TLV to all TTZ nodes adjacent to T1. For example, in FIG. 2, T1 would send the LSP to T2, T6 and T8. T1 would not send the LSP to R2, R4 or R6, because R2, R4 and R6 are not TTZ nodes. Responsive to receiving the LSP containing the TTZ TLV with the T flag 320 set to 1, each TTZ node adjacent to T1 distributes the LSP to all its adjacent TTZ nodes except for T1 from which the LSP is received, adds a TTZ TLV, such as the TTZ TLV 300 of FIG. 3, to its LSP and sends its LSP to all TTZ nodes adjacent to it. In an embodiment, a TTZ edge node adds a second TTZ TLV to its LSP in response to receiving the LSP containing the TTZ TLV with the T flag 320 set to 1, and the second TTZ TLV comprises a TTZ ID of the TTZ to which the TTZ edge node belongs, a sub-TLV 400 for the TTZ intermediate system neighbors connected to the TTZ edge node and a sub-TLV 500 for the TTZ end system neighbors connected to the TTZ edge node. In another embodiment, a TTZ internal node adds a third TTZ TLV to its LSP in response to receiving the LSP containing the TTZ TLV with the T flag 320 set to 1, and the third TTZ TLV comprises a TTZ ID of the TTZ to which the TTZ internal node belongs but does not comprise any sub-TLV. In another embodiment, a TTZ internal node adds a fourth TTZ TLV to its LSP in response to receiving the LSP containing the TTZ TLV with the T flag 320 set to 1, and the fourth TTZ TLV comprises a TTZ ID of the TTZ to which the TTZ internal node belongs, a sub-TLV 400 for the TTZ intermediate system neighbors connected to the TTZ internal node and a sub-TLV 500 for the TTZ end system neighbors connected to the TTZ internal node. In addition, each adjacent node stores the information in the LSP with the TTZ TLV received from T1. This procedure continues until all nodes that are to be included in the TTZ possess topology information regarding all other nodes that are to be included in the TTZ.

In the triggering of migration step, a network administrator or a similar entity issues a migration command to one node that is to be included in the TTZ. The node to which the migration command is issued may or may not be the same as the node to which the command to prepare for migration is issued. The node that receives the migration command sets the M flag 330 in its TTZ TLV to indicate that migration to the TTZ is to occur. For instance, the M flag 330 may be set to 1. The node that receives the migration command then sends its LSP containing the TTZ TLV to all of its adjacent TTZ nodes. Responsive to receiving the LSP with the TTZ TLV with the M flag 330 set to 1, each of the adjacent nodes stores the information in the LSP and distributes the LSP to its adjacent TTZ nodes except for the node from which the LSP is received. This procedure continues until all nodes that are to be included in the TTZ are informed that migration to the TTZ is to occur. At that point, virtual circuits between edge nodes, such as the virtual circuit 201 between T1 and T3 and virtual circuit 202 between T1 and T4, may be included in the LSPs generated TTZ edge nodes. The LSPs are distributed to the nodes outside of the TTZ. Information regarding the actual TTZ circuits attached to a TTZ edge node, such as the circuit from T1 to T2, the circuit from T1 to T8 or the circuit from T1 to T6, may then be removed from the LSP of the edge node such as T1.

The above procedures will now be described in more detail. Transferring a group of routers and a number of circuits connecting the routers in an area to work as a TTZ without any service interruption may involve a number of steps or stages. To begin, a user may configure the TTZ feature on every router in the TTZ. That is, every router chosen to be in the TTZ is given the same TTZ ID, such as the TTZ ID 100 in FIG. 2. In this stage, a router discovers its TTZ neighbors but does not update its LSP. The discovery of TTZ neighbors may be performed through the use of Hello messages, as described in more detail below. After configuring the TTZ, a user may issue a command on one router in the TTZ, which triggers every router in the TTZ to distribute TTZ information among the routers in the TTZ. That is, when one router, such as T1 in FIG. 2, receives the command, that router updates its LSP by adding a TTZ TLV, such as the TTZ TLV 300 of FIG. 3, and distributes the LSP to its TTZ neighbors. The LSP has the T flag 320 in the flags field 303 in the TTZ TLV 300 set to 1, indicating TTZ information generation and distribution for migration. When a router in the TTZ receives the LSP with the T flag set to 1, the receiving router updates its LSP by adding a TTZ TLV. In this stage, every router in the TTZ has dual roles. One is to function as a normal router. The other is to generate and distribute TTZ information. Next, a user may check whether every router in the TTZ is ready for transferring to work as a TTZ router. A router in the TTZ is ready after it has received all the necessary information from all the routers in the TTZ. This information may be displayed on a router through a command. A user may then activate the TTZ using a command such as "migrate to on one router in the TTZ. That router transfers to work as a TTZ router and updates its LSP with the M flag 330 set to 1 in the TTZ TLV, indicating a migration to the TTZ, after receiving the command. That router then distributes its TTZ TLV with the M flag 330 set to 1 to its TTZ neighbors. After any router in the TTZ receives the LSP with the M flag 330 set to 1, the receiving router also transfers to work as a TTZ router. Thus, activating the TTZ on one TTZ router makes every router in the TTZ transfer to work as a TTZ router, which computes routes using the TTZ topology and the topology outside of the TTZ. For an edge router of the TTZ, transferring to work as a TTZ router comprises updating its LSP to virtualize the TTZ by adding each of the other TTZ edge routers as an intermediate system (IS) neighbor and flooding this LSP to all its direct neighboring routers. Then, the TTZ edge router removes the IS neighbors corresponding to the IS neighbors in the TTZ TLV (i.e., in the TTZ ISN sub-TLV 400 and TTZ ESN sub-TLV 500) from an Intermediate System Neighbors TLV and an End System Neighbors TLV in the LSP.

When preparing for a migration into an ISIS TTZ, TTZ edge network nodes add TTZ TLVs into their LSPs. The TTZ TLVs comprise a TTZ ID and sub-TLVs for TTZ nodes connected to the TTZ edge network nodes. When migration to the TTZ is initiated, the TTZ edge network nodes add point-to-point (P2P) circuits to the other TTZ edge network nodes into their LSPs. TTZ edge network nodes do not distribute LSPs for TTZ internal network nodes to network nodes outside of an ISIS TTZ. After a TTZ edge network node receives LSPs with virtual circuits from other TTZ edge network nodes, for example, for a predefined amount of time, the TTZ edge network node removes TTZ circuits from its LSP.

When preparing for a migration into an ISIS TTZ, TTZ internal network nodes add TTZ TLVs into their LSPs. TTZ TLVs for internal TTZ network nodes comprise a TTZ ID and flags indicating that the TTZ network node is a TTZ internal network node. For example, the E flag 310 in the TTZ TLV 300 in FIG. 3 may be set to 0. TTZ circuits in TTZ TLVs of an LSP from a TTZ edge network node are stored in a link state database (LSDB) with a flag set indicating that they are TTZ circuits, and the corresponding circuits in an Intermediate System Neighbors TLV or End System Neighbors TLV in the LSP are also stored in the LSDB with a flag not set indicating that they are normal circuits. Each network node may have its own LSDB. P2P circuits in an LSP from a TTZ edge network node for virtualizing an ISIS TTZ are identified and stored in the LSDB with a flag set indicating the P2P circuits are unusable for computing routes by a TTZ network node. When migration to the ISIS TTZ is initiated, TTZ network nodes compute routes using TTZ circuits, for example, when there are both TTZ circuits and normal circuits to the same TTZ network nodes. TTZ network nodes compute routes using normal circuits, for example, when there are only normal circuits to the TTZ network nodes. P2P circuits for virtualizing TTZ are not used for computing routes by a TTZ network node.

For existing P2P adjacencies, a TTZ network node may add a TTZ TLV into its Hello message to a TTZ circuit and send the Hello message to a remote network node when a TTZ ID of the TTZ circuit is configured or implied on the TTZ network node. The TTZ TLV may comprise the TTZ ID. The TTZ network node records TTZ adjacencies after receiving Hello messages from the remote network node with the same TTZ ID as the Hello message that is sent to the remote network node.

For existing adjacencies on a broadcast circuit connecting a designated intermediate system (DIS) TTZ network node and a number of non-DIS TTZ network nodes, each of the non-DIS TTZ network nodes adds a TTZ TLV into its Hello message to the circuit and sends the Hello message to the DIS TTZ network node when a TTZ ID of the connection to the circuit is configured or implied on the non-DIS TTZ network node. The DIS TTZ network node adds a TTZ TLV into its Hello message to the circuit, sends the Hello message to other network nodes (i.e., the non-DIS TTZ network nodes) after a TTZ ID of the connection to the circuit is configured or implied on the DIS TTZ network node and it receives Hello messages with the same TTZ ID from each of other nodes as the Hello message that is sent to other network nodes, and records TTZ adjacencies with each of other network nodes. Each of the other network nodes records TTZ adjacencies after receiving Hello messages with the same TTZ ID from the DIS TTZ network node.

Describing the above procedures differently, every TTZ internal router in a TTZ, such as routers T2, T5, T6, T7 and T8 in FIG. 2, adds a TTZ TLV into its LSP. The TTZ TLV has a TTZ ID set to the ID of the TTZ, such as the TTZ ID 100 in FIG. 2, and has a flag set to indicate that the router is a TTZ internal router. For example, the E flag 310 in the TTZ TLV 300 may be set to 0. The router floods its LSP to its neighbors in the TTZ. When a router inside the TTZ receives an LSP containing a TTZ TLV from a neighboring router in the TTZ, the router stores the link state and floods the link state to the other neighboring routers in the TTZ.

Every edge router of a TTZ updates its LSP in a series of steps and floods the LSP to all its neighbors. In one step, the edge router adds a TTZ TLV into its LSP. The TLV has a TTZ ID set to the ID of the TTZ, a flag set to indicate that the router is a TTZ edge router, and a TTZ ISN sub-TLV. For example, the TTZ ID may be set to 100 as in FIG. 2, the E flag 310 in the TTZ TLV 300 may be set to 1, and the TTZ ISN sub-TLV 400 of FIG. 4 may be included in the sub-TLV field 305 of the TTZ TLV 300 in FIG. 3. The TTZ ISN sub-TLV contains information about the TTZ IS neighbors connected to the TTZ edge router. In addition, the TLV may have a TTZ ESN sub-TLV comprising information about the TTZ end systems connected to the TTZ edge router. In another step, the edge router adds each of the other TTZ edge routers as an IS neighbor into the Intermediate System Neighbors TLV in the LSP. The metric to the neighbor is the metric of the shortest path to the edge router within the TTZ. In another step, the edge router removes the IS neighbors corresponding to the IS neighbors in the TTZ TLV (i.e., in the TTZ ISN sub-TLV 400) from an Intermediate System Neighbors TLV in the LSP, and the end system (ES) neighbors corresponding to the ES neighbors in the TTZ TLV (i.e., in the TTZ ESN sub-TLV 500) from an End System Neighbors TLV in the LSP.

Two routers A and B connected by a P2P circuit and having a normal adjacency may discover each other's TTZ by including a TTZ TLV containing a TTZ ID in their Hello messages. If two ends of the circuit have the same TTZ ID, A and B are TTZ neighbors; otherwise, they are not TTZ neighbors, but instead are normal neighbors. A number of routers connected through a broadcast circuit and having normal adjacencies among them also can discover each other's TTZ by including a TTZ TLV containing a TTZ ID in their Hello messages. The designated router (DR) (i.e., DIS) for the circuit "forms" TTZ adjacency with each of the other routers if all the routers attached to the circuit have the same TTZ ID configured on the connections to the circuit and included in their Hello messages. Otherwise, they are not TTZ neighbors, but instead are normal neighbors.

When a router (say A) is connected via a P2P circuit to another router (say B) and there is not any adjacency between them over the circuit, a user may configure TTZ on two ends of the circuit to form a TTZ adjacency. Routers A and B include a TTZ TLV containing a TTZ ID in their Hello messages. If two routers have the same TTZ IDs in their Hello messages, an adjacency between these two routers is to be formed. Otherwise, no adjacency is formed. A number of routers connected through a broadcast circuit and having no adjacency among them may start to form TTZ adjacencies after TTZ is configured on the circuit and a TTZ TLV with a TTZ ID is included in their Hello messages. The DR (i.e., DIS) for the circuit forms TTZ adjacency with each of the other routers if all the routers attached to the circuit have the same TTZ ID configured on the connections to the circuit and included in the Hello messages. Otherwise, the DR does not form any adjacency with any router attached to the circuit.

An edge router in a TTZ, in addition to establishing adjacencies with other routers in the TTZ that have connections with the edge router, may form an adjacency with any router outside of the TTZ that has a connection with the edge router in a manner described herein. When an edge router synchronizes its link state database with a router outside of the TTZ, the edge router sends the router outside of the TTZ the information about all the LSPs in its LSDB except for the LSPs that are hidden from any router outside of the TTZ. At the end of the link state database synchronization, the edge router originates its own LSP and sends this LSP to the router outside of the TTZ. This LSP contains two groups of circuits. The first group of circuits includes the circuits connecting to the routers outside of the TTZ from this TTZ edge router. The second group of circuits includes the "virtual" circuits connecting to the other TTZ edge routers from this TTZ edge router. From the point of view of the router outside of the TTZ, the other end is seen as a normal router and the adjacency is formed in the same way as for a normal router. The router outside of the TTZ is not aware of anything about its neighboring TTZ. From the LSPs related to the TTZ edge router in the other end, the router outside of the TTZ knows that the TTZ edge router is connected to each of the other TTZ edge routers and some routers outside of the TTZ.

In other words, in an ISIS TTZ, TTZ internal network nodes add a TTZ TLV with TTZ ID into their LSPs, one LSP is generated by each of the TTZ edge network nodes, and migration to an ISIS TTZ can be implemented using existing LSPs with flags.

When distribution of TTZ information is triggered on a TTZ network node, the TTZ network node adds a TTZ TLV into one of its LSPs accordingly. For example, the TTZ network node sets a flag in a TTZ TLV in one of its LSPs and floods, or sends, the LSP to its adjacent TTZ network nodes. For instance, the T flag 320 in the TTZ TLV 300 in FIG. 3 may be set to 1. If the TTZ network node is a TTZ internal network node, the TTZ network node adds a TTZ TLV for the TTZ internal node as described above. If the TTZ network node is a TTZ edge network node, the TTZ network node adds a TTZ TLV for the TTZ edge network node as described above. When a TTZ network node receives an LSP having a TTZ TLV with the T flag 320 set to 1, the TTZ network node floods the LSP, adds a second TTZ TLV into one of its own LSPs accordingly, and floods its LSP to its adjacent TTZ network nodes.

When migration to an ISIS TTZ is activated on a TTZ network node, the TTZ network node sets a flag in a TTZ TLV in one of its LSPs and floods the LSP to its adjacent TTZ network nodes. For instance, the M flag 330 in the TTZ TLV 300 in FIG. 3 may be set to 1. If the TTZ network node is a TTZ edge network node, the TTZ network node adds P2P circuits to other edges into its LSPs and floods the LSPs. The TTZ edge network node removes normal circuits corresponding to TTZ circuits from its LSPs after receiving all LSPs containing virtual circuits from other TTZ edge network nodes, for example, for a predetermined amount of time. The TTZ network node computes routes using TTZ circuits, if present, and normal circuits, but not using P2P circuits for virtualizing TTZ. When a TTZ network node receives an LSP having a TTZ TLV with the M flag 330 set to 1, the TTZ network node floods the LSP.

In another embodiment, when distribution of TTZ information is triggered on a TTZ network node, the TTZ network node sets a flag in a TTZ TLV in a Hello message to its adjacent TTZ network nodes and sends the Hello message. For instance, the T flag 320 in the TTZ TLV 300 in FIG. 3 may be set to 1. Each of the adjacent TTZ network nodes adds a second TTZ TLV into its LSP accordingly and floods the LSP to their adjacent TTZ network nodes. If the TTZ network node is a TTZ internal network node, the TTZ network node adds a TTZ TLV for the TTZ internal network node as described above. If the TTZ network node is a TTZ edge network node, the TTZ network node adds a TTZ TLV for the TTZ edge network node as described above. Each of the adjacent TTZ network nodes sets a flag in a TTZ TLV in a Hello message to its adjacent TTZ network nodes and sends the Hello message. The TTZ network node is configured to respond similarly to the adjacent network nodes when the TTZ network node receives Hello message having a TTZ TLV with the T flag 320 set to 1.

LSPs can be divided into two classes according to their distributions. One class of LSPs is distributed within a TTZ, and the other is distributed through a TTZ.

Any LSP generated for a TTZ internal router in a TTZ is distributed within the TTZ. It will not be distributed to any router outside of the TTZ. Any pseudonode LSP generated for a broadcast network inside a TTZ is distributed within the TTZ. It will not be distributed to any router outside of the TTZ.

Any LSP about a link state outside of a TTZ received by an edge router of the TTZ is distributed through the TTZ. Any LSP about a link state for virtualizing the TTZ generated by a TTZ edge router is distributed through the TTZ. For example, when an edge router of a TTZ receives an LSP for a link state outside of the TTZ from a router outside of the TTZ, the edge router floods the LSP to its neighboring routers both inside the TTZ and outside of the TTZ. This LSP may be any LSP such as a router LSP that is distributed in a domain. The routers in the TTZ continue to flood the LSP. When another edge router of the TTZ receives the LSP, the other edge router floods the LSP to its neighboring routers both outside the TTZ and inside the TTZ.

The computation of the routing table for a router outside of a TTZ may be similar to that known in the prior art. For a router inside a TTZ, the computation of the routing table may be similar to that known in the prior art, with one exception. A router inside a TTZ may ignore the circuits in the router LSPs generated by the edge routers of the TTZ for virtualizing the TTZ. The routing table on a router inside a TTZ may be computed using the LSDB containing the LSPs for the topology of the TTZ and the LSPs for the topology outside of the TTZ. The shortest path to every destination both inside the TTZ and outside the TTZ is computed over all the circuits including the circuits inside the TTZ and the circuits outside the TTZ.

As described above, if every circuit in a TTZ is configured with the same TTZ ID as a TTZ circuit, the TTZ is determined. A router with some TTZ circuits and some normal circuits is a TTZ edge router. A router with only TTZ circuits is a TTZ internal router. Alternatively, the same TTZ ID may be configured on every router in the TTZ and on every edge router's circuits connecting to the routers in the TTZ. A router configured with the TTZ ID on some of its circuits is a TTZ edge router. A router configured with the TTZ ID only is a TTZ internal router. All the circuits on a TTZ internal router are TTZ circuits. The latter option may be simpler than that described above.

When a non-TTZ router, such as R2 in FIG. 2, is connected via a P2P circuit to a TTZ router, such as T1 in FIG. 2, working as a TTZ and with a normal adjacency between the routers over the circuit, a user can configure the TTZ on two ends of the circuit to add R2 into the TTZ to which T1 belongs. The routers perform TTZ discovery on each other in the manner described above. When a number of non-TTZ routers are connected via a broadcast circuit to a TTZ router (say T1) working as a TTZ and with normal adjacencies among them, a user may configure TTZ on the connection to the circuit on every router to add the non-TTZ routers into the TTZ to which T1 belongs. The DR (i.e., DIS) for the circuit "forms" TTZ adjacency with each of the other routers if all the routers have the same TTZ ID configured on the connections to the circuit. When the router R2 is connected via a P2P circuit to the TTZ router T1 and there is not any adjacency between them over the circuit, a user can configure TTZ on two ends of the circuit to add R2 into the TTZ to which T1 belongs. R2 and T1 will form an adjacency in the manner described above. When the router R2 is connected via a broadcast circuit to a group of TTZ routers on the circuit and there is not any adjacency between R2 and any over the circuit, a user can configure TTZ on the connection to the circuit on R2 to add R2 into the TTZ to which the TTZ routers belong. R2 starts to form an adjacency with the DR for the circuit after the configuration.

Figure 6:
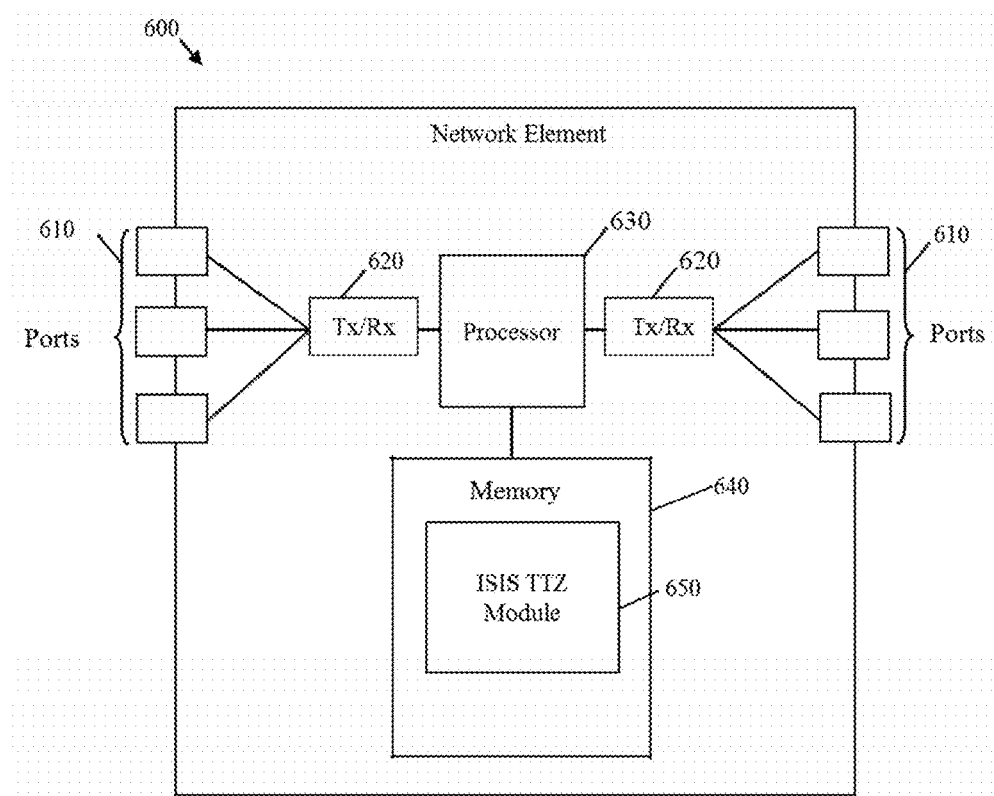
FIG. 6 is a schematic diagram of an embodiment of a network element for implementing an ISIS TTZ.

FIG. 6 is a schematic diagram of a network element 600 for implementing an ISIS TTZ. The network element 600 may be suitable for implementing the disclosed embodiments. For instance, the network element 600 may implement TTZ network nodes T1-T8 in the ISIS TTZ shown in FIG. 2. Network element 600 comprises ports 610, transceiver units (Tx/Rx) 620, a processor 630, and a memory 640 comprising an ISIS TTZ module 650. Ports 610 are coupled to Tx/Rx 620, which may be transmitters, receivers, or combinations thereof The Tx/Rx 620 may transmit and receive data via the ports 610. Processor 630 is configured to process data. Memory 640 is configured to store data and instructions for implementing embodiments described herein. The network element 600 may also comprise electrical-to-optical (EO) components and optical-to-electrical (OE) components coupled to the ports 610 and Tx/Rx 620 for receiving and transmitting electrical signals and optical signals.

The processor 630 may be implemented by hardware and software. The processor 630 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 630 is in communication with the ports 610, Tx/Rx 620, and memory 640.

The memory 640 comprises one or more of disks, tape drives, and solid-state drives and may be used as an overflow data storage device, to store programs when such programs are selected for execution, and to store instructions and data that are read during program execution. The memory 640 may be volatile and non-volatile and may be read-only memory (ROM), random-access memory (RAM), ternary content-addressable memory (TCAM), and static random-access memory (SRAM). ISIS TTZ module 650 is implemented by processor 630 to execute the instructions for implementing various embodiments of an ISIS TTZ.

In an embodiment, the Tx/Rx 620 is configured to receive an ID of an ISIS TTZ. The Tx/Rx 620 is further configured to receive an indication to distribute topology information related to the ISIS TTZ to other network nodes assigned to the ISIS TTZ. The processor 630 is configured to initiate inclusion of a TTZ TLV in TTZ-related information associated with a network node and initiate distribution of the TTZ-related information to all nodes adjacent to the network node. The TTZ TLV may be configured as shown in FIG. 3. When the network node is an edge node, the indication to distribute topology information related to the ISIS TTZ may be a command received by the edge node. When the network node is an internal node, the indication to distribute topology information related to the ISIS TTZ may be the reception by the internal node of a TTZ TLV from another node, where the received TTZ TLV contains an indicator set to indicate that topology information is to be distributed. The TTZ-related information associated with the network node may be an LSP associated with the network node or a Hello message transmitted by the network node.

Figure 7:
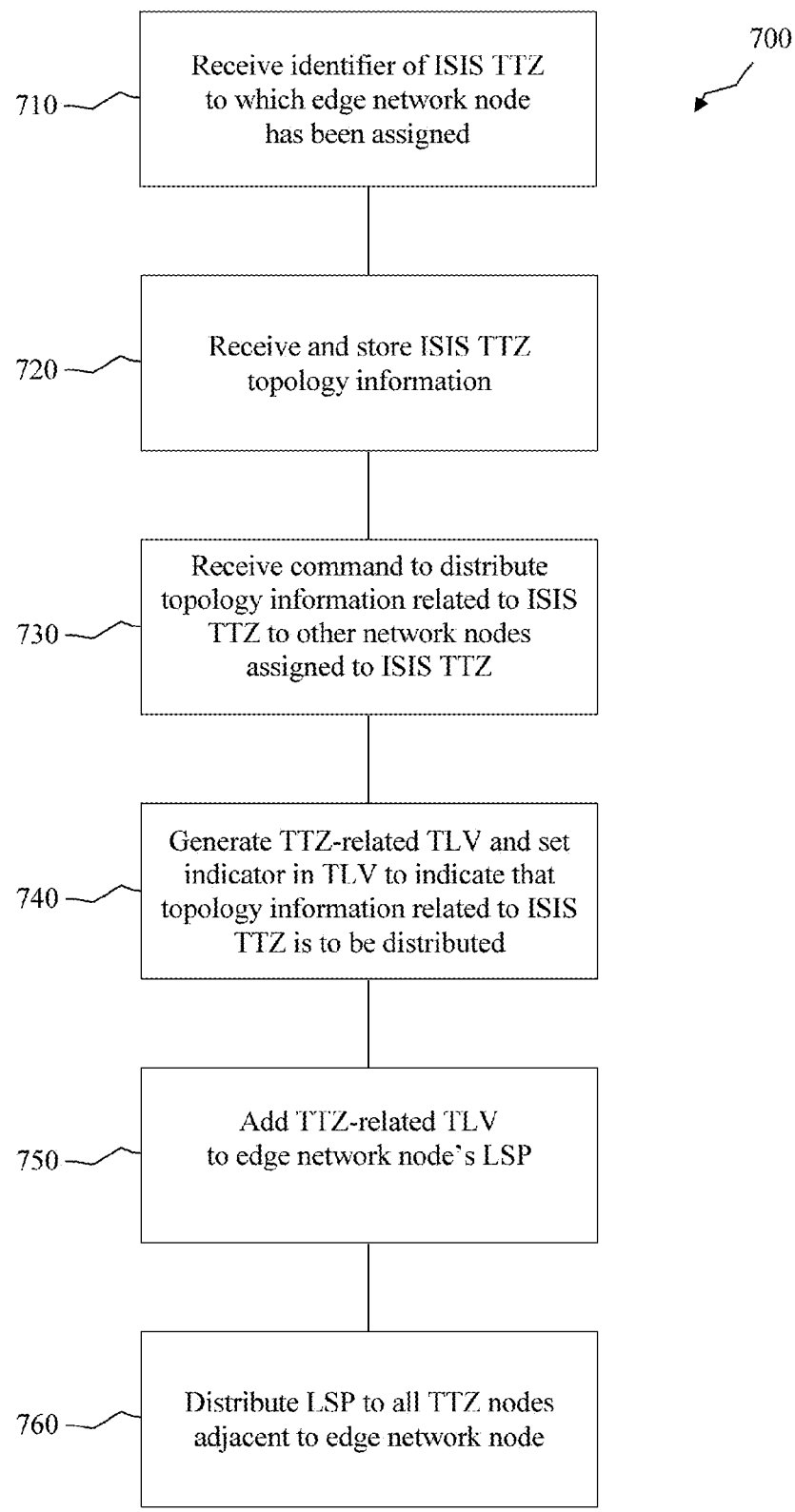
FIG. 7 is a flowchart of an embodiment of a method for an edge network node to participate in implementing an ISIS TTZ.

FIG. 7 is a flowchart of an embodiment of a method 700 for an edge network node in an ISIS TTZ. The method 700 may be performed when establishing or setting up an ISIS TTZ. At block 710, the edge network node receives an identifier of an ISIS TTZ to which the edge network node has been assigned. At block 720, the edge network node receives and stores ISIS TTZ topology information. At block 730, the edge network node receives a command to distribute topology information related to the ISIS TTZ to other network nodes assigned to the ISIS TTZ. At block 740, the edge network node generates a TTZ-related TLV and sets an indicator in the TTZ-related TLV to indicate that topology information related to the ISIS TTZ is to be distributed. At block 750, the edge network node adds a TTZ-related TLV to the edge network node's LSP. At block 760, the edge network node distributes the LSP to all TTZ nodes adjacent to the edge network node.

Figure 8:
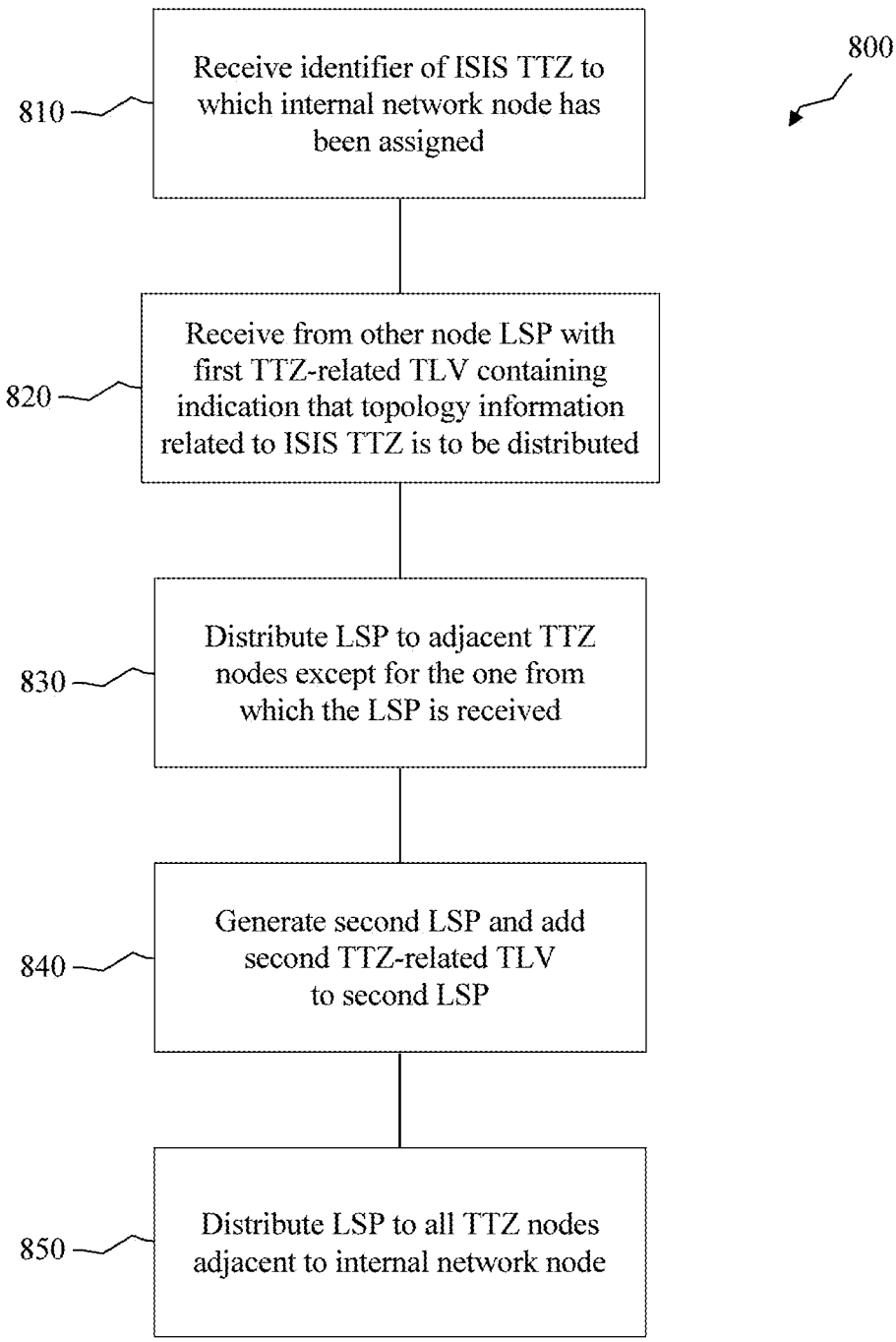
FIG. 8 is a flowchart of an embodiment of a method for an internal network node to participate in implementing an ISIS TTZ.

FIG. 8 is a flowchart of an embodiment of a method 800 for an internal network node in an ISIS TTZ. The method 800 may be performed when establishing or setting up an ISIS TTZ. At block 810, the internal network node receives an identifier of an ISIS TTZ to which the internal network node has been assigned. At block 820, the internal network node receives from another node an LSP with a first TTZ-related TLV containing an indication that topology information related to the ISIS TTZ is to be distributed. The first TTZ-related TLV may further contain topology information related to the other node. At block 830, the internal network node distributes the LSP to all its adjacent TTZ nodes except for the one from which the LSP is received. At block 840, the internal network node generates a second LSP and adds a second TTZ-related TLV to the second LSP. The second TTZ-related TLV may not contain topology information related to the internal network node. At block 850, the internal network node distributes its LSP to all TTZ nodes adjacent to the internal network node.

Figure 9:
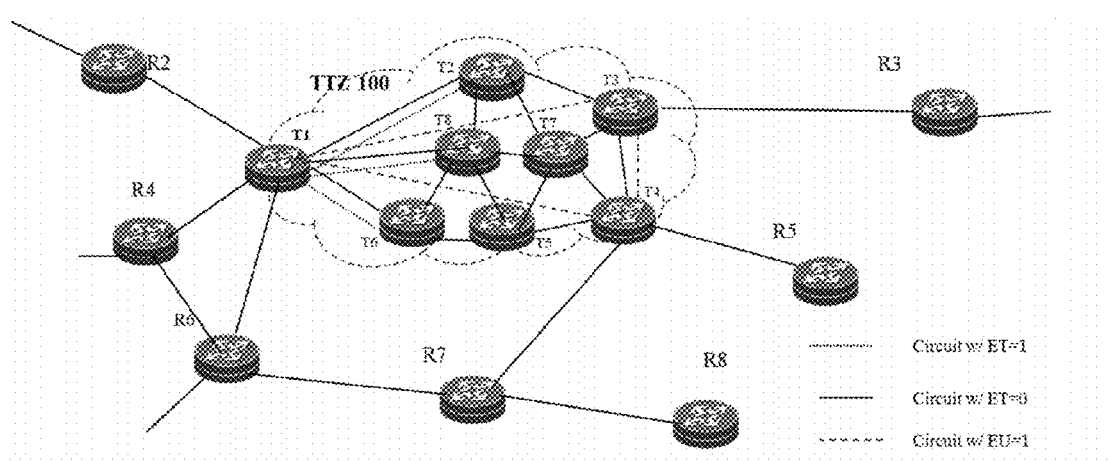
FIG. 9 is a schematic diagram of an embodiment of an ISIS TTZ employing a plurality of circuits.

FIG. 9 is an embodiment of an ISIS TTZ employing a plurality of circuits between the TTZ network nodes of the ISIS TTZ. The LSP generated by edge node T1 of TTZ 100 comprises three groups of circuits when T1 starts to migrate to TTZ. The first group of circuits includes two virtual circuits: one from T1 to T3 and the other from T1 to T4. These two virtual circuits are represented by dashed lines in FIG. 9. The second group of circuits includes six normal circuits connected to T1, which are the circuit from T1 to R2, the circuit from T1 to R4, the circuit from T1 to R6, the circuit from T1 to T2, the circuit from T1 to T6 and the circuit from T1 to T8. These six circuits are represented by solid dark lines. The third group of circuits includes three TTZ circuits configured on T1, which are the TTZ circuit from T1 to T2, the TTZ circuit from T1 to T6 and the TTZ circuit from T1 to T8. These three circuits are represented by dotted lines. The first group of circuits and the second group of circuits are included in an Intermediate System Neighbors TLV in the LSP. The third group of circuits is included in a TTZ TLV with a TTZ ISN sub-TLV in the LSP. There are three normal circuits to TTZ nodes in the second group, which are the normal circuit from T1 to T2, the normal circuit from T1 to T6 and the normal circuit from T1 to T8.

These three normal circuits are removed from the LSP by TTZ edge node T1 after T1 receives LSPs containing virtual circuits from all other TTZ edge nodes for a given period of time such as 0.1 second. When a TTZ node receives an LSP with three groups of circuits as described above, the TTZ node may store the information in the LSP into its LSDB. For a virtual circuit, a flag EU associated with the circuit may be set to 1, indicating that the circuit cannot be used for the TTZ node to compute a routing table. For a TTZ circuit, a flag ET associated with the circuit may be set to 1, indicating that the circuit is a TTZ circuit and may be used for the TTZ node to compute a routing table after migrating to TTZ. For a normal circuit, a flag ET associated with the circuit may be set to 0 indicating that the circuit is a normal circuit and may be used for the TTZ node to compute a routing table after migrating to TTZ.

Figure 10:
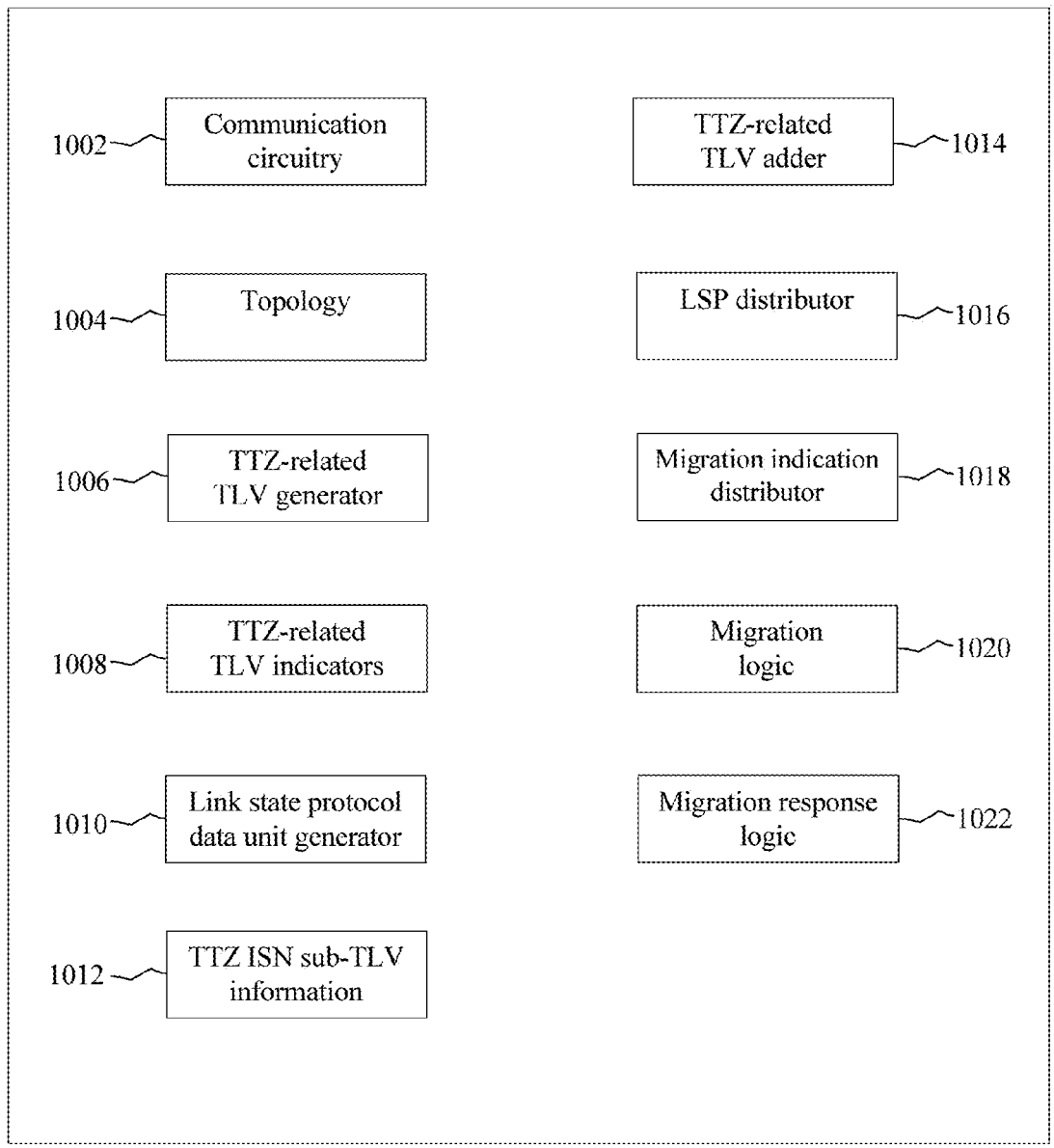
FIG. 10 is a functional block diagram of components that may carry out steps in the embodiments disclosed herein.

FIG. 10 is a functional block diagram of a node with configured to operate according to one or more embodiments disclosed herein. A node 1000 includes communication circuitry 1002 that may be configured to transmit and/or receive information as described herein including an identifier of an ISIS TTZ to which the edge network node has been assigned. The node 1000 may be further configured to receive and store ISIS TTZ topology information in topology block 1004. The node 1000 may be further configured to receive a command to distribute the ISIS TTZ topology information to other network nodes assigned to the ISIS TTZ. A TTZ-related TLV generator 1006 may be configured to generate a TTZ-related TLV and to set an indicator in the TTZ-related TLV to indicate that topology information related to the ISIS TTZ is to be distributed. The TTZ-related TLV may include one or more TTZ-related TLV indicators stored within TTZ-related TLV indicators block 1008. An LSP generator 1010 may be configured to generate an LSP that is to be transmitted by the edge network node. The LSP may include TTZ ISN sub-TLV information stored in TTZ ISN sub-TLV information block 1012. A TTZ-related TLV adder 1014 may be configured to add the TTZ-related TLV to the LSP. An LSP distributor 1016 may be configured to distribute the LSP to all TTZ nodes adjacent to the edge network node. A migration indication distributor 1018 may be configured to distribute a migration indication, wherein the migration may occur based on migration logic 1020. Migration response logic 1022 may process a response to a migration.

One or more of the steps in the embodiments disclosed herein may be carried out based on instructions stored on computer-readable non-transitory media. The computer-readable non-transitory media includes all types of computer readable media, including magnetic storage media, optical storage media, and solid state storage media and specifically excludes signals. It should be understood that the software can be installed in and sold with a device executing the instructions. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In an embodiment, an ISIS TTZ may be implemented similarly to the implementation described in Internet Engineering Task Force (IETF) draft-chen-isis-ttz-03.txt entitled, "IS-IS Topology-Transparent Zone," by Chen, et al. to be published, which is hereby incorporated by reference as if reproduced in its entirety.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for an edge network node in an intermediate-system-to-intermediate-system (ISIS) topology-transparent-zone (TTZ), comprising:
   receiving an identifier of the ISIS TTZ to which the edge network node has been assigned;
   receiving and storing ISIS TTZ topology information;
   receiving a command to distribute the ISIS TTZ topology information to other network nodes assigned to the ISIS TTZ;
   generating a TTZ-related type-length-value (TLV) and setting an indicator in the TTZ-related TLV to indicate that topology information related to the ISIS TTZ is to be distributed;
   adding the TTZ-related TLV to a link state protocol data unit (LSP) that is to be transmitted by the edge network node; and
   distributing the LSP to all TTZ nodes adjacent to the edge network node assigned to the ISIS TTZ.

2. The method of claim 1, wherein generating the TTZ-related TLV comprises generating the TTZ-related TLV to include:
   the identifier of the ISIS TTZ;
   a first indicator configured to indicate whether a network node is the edge network node or an internal network node;
   a second indicator configured to indicate whether topology information related to the ISIS TTZ is to be distributed;
   a third indicator configured to indicate whether migration to the ISIS TTZ is to occur;
   a fourth indicator configured to indicate whether normal topology information for rollback is to be distributed;
   a fifth indicator configured to indicate whether rolling back from the ISIS TTZ is occurring; and
   a sub-TLV field containing information about TTZ nodes adjacent to the edge network node.

3. The method of claim 2, wherein the sub-TLV field comprises:
   a TTZ intermediate system network (ISN) sub-TLV containing information related to at least one TTZ node adjacent to the edge network node that is an intermediate system node; and
   a TTZ end system network (ESN) sub-TLV containing information related to at least one adjacent TTZ node that is an end system node, when the edge network node has at least one adjacent TTZ node that is the end system node.

4. The method of claim 3, wherein the ISN sub-TLV comprises:
   an identifier of the at least one TTZ node adjacent to the edge network node that is the intermediate system node; and
   at least one metric related to the at least one TTZ node adjacent to the edge network node that is the intermediate system node.

5. The method of claim 3, wherein the ESN sub-TLV comprises:
   an identifier of the at least one TTZ node adjacent to the edge network node that is an end system node; and
   at least one metric related to the at least one TTZ node adjacent to the edge network node that is the end system node.

6. The method of claim 3, further comprising:
   receiving a command to migrate to the ISIS TTZ;
   setting an indicator in the TTZ-related TLV to indicate that migration to the ISIS TTZ is to occur; and
   distributing to all TTZ nodes adjacent to the edge network node the LSP with the indicator in the TTZ-related TLV set to indicate that migration to the ISIS TTZ is to occur.

7. The method of claim 6, wherein, responsive to receiving the command to migrate to the ISIS TTZ, the edge network node adds other edge network nodes assigned to the ISIS TTZ to an Intermediate System Neighbors TLV in the edge network node's LSP, removes from the Intermediate System Neighbors TLV any adjacent node contained in the TTZ ISN sub-TLV, and removes from an End System Neighbors TLV in the edge network node's LSP any adjacent node contained in the TTZ ESN sub-TLV.

8. A method for an internal network node in an intermediate-system-to-intermediate-system (ISIS) topology-transparent-zone (TTZ), comprising:
receiving an identifier of the ISIS TTZ to which the internal network node has been assigned;
receiving from another node a first link state protocol data unit (LSP) with a first TTZ-related type-length-value (TLV) containing an indication that topology information related to the ISIS TTZ is to be distributed, wherein the first TTZ-related TLV further contains topology information related to the other node;
distributing the first LSP to adjacent TTZ nodes of the internal network node;
generating a second LSP and adding a second TTZ-related TLV to the second LSP, wherein the second TTZ-related TLV does not contain topology information related to the internal network node; and
distributing the second LSP to all TTZ nodes adjacent to the internal network node.

9. The method of claim 8, wherein the second TTZ-related TLV comprises:
the identifier of the ISIS TTZ; and
a first indicator configured to indicate whether a network node is an edge network node or an internal network node.

10. The method of claim 9, wherein, responsive to receiving the first TTZ-related TLV, the internal network node sets the first indicator in the second TTZ-related TLV to indicate that the internal network node is the internal network node.

11. The method of claim 10, wherein setting the first indicator in the second TTZ-related TLV to indicate that the internal network node is the internal network node further indicates that all circuits connected to the internal network node are TTZ circuits.

12. The method of claim 8, further comprising:
receiving from another node a third LSP with an indication that migration to the ISIS TTZ is to occur; and
distributing the third LSP to all the TTZ nodes adjacent to the internal network node except for the TTZ node from which the third LSP is received.

13. The method of claim 8, further comprising:
receiving from another node a fourth LSP generated by a TTZ edge node containing virtual circuits;
storing information in the fourth LSP in the internal network node's link state database (LSDB) and setting a flag for each of the virtual circuits to indicate that each of the virtual circuits is unusable for computing a routing table; and
distributing the fourth LSP to all the TTZ nodes adjacent to the internal network node except for the TTZ node from which the fourth LSP is received.

14. The method of claim 13, wherein, responsive to receiving the third LSP with the indication that migration to the ISIS TTZ is to occur, the internal network node computes a routing table using TTZ circuits and normal circuits in the internal network node's LSDB without using the virtual circuits with the flag set to indicate that the virtual circuits are unusable for computing the routing table.

15. A network node comprising:
a receiver configured to:
receive an identifier of an intermediate-system-to-intermediate-system (ISIS) topology-transparent-zone (TTZ) to which the network node has been assigned;
receive and store ISIS TTZ topology information; and
receive an indication to distribute the ISIS TTZ topology information to other network nodes assigned to the ISIS TTZ; and a processor coupled to the receiver and configured to:
generate a TTZ-related type-length-value (TLV) and set an indicator in the TTZ-related TLV to indicate that topology information related to the ISIS TTZ is to be distributed;
add the TTZ-related TLV to TTZ-related information associated with the network node; and
initiate distribution of the TTZ-related information to all TTZ nodes adjacent to the network node, wherein the TTZ-related TLV includes:
the identifier of the ISIS TTZ;
a first indicator configured to indicate whether the network node is an edge network node or an internal network node;
a second indicator configured to indicate that topology information related to the ISIS TTZ is to be distributed;
a third indicator configured to indicate whether migration to the ISIS TTZ is to occur;
a fourth indicator configured to indicate whether normal topology information for rollback is to be distributed;
a fifth indicator configured to indicate whether rolling back from the ISIS TTZ is occurring; and
a sub-TLV field containing information about at least one TTZ node adjacent to the network node.

16. The network node of claim 15, wherein the indication to distribute topology information related to the ISIS TTZ is at least one of:
a command received by the network node; and
reception by the network node of the TTZ-related TLV in a link state protocol data unit (LSP) from another node, wherein the received TTZ-related TLV includes the second indicator set to indicate that topology information related to the ISIS TTZ is to be distributed.

17. The network node of claim 15, wherein the TTZ-related information associated with the network node is at least one of:
a link state protocol (LSP) associated with the network node; and
a Hello message transmitted by the network node.

18. The network node of claim 15, wherein the sub-TLV field includes a TTZ intermediate system network (ISN) sub-TLV containing:
an identifier of at least one TTZ node adjacent to the network node that is an intermediate system node; and
at least one metric related to the at least one TTZ node adjacent to the network node that is an intermediate system node.

19. The network node of claim 18, wherein, when the network node has at least one adjacent TTZ node that is an end system node, the sub-TLV field further includes a TTZ end system network (ESN) sub-TLV containing:
an identifier of the at least one adjacent TTZ node that is the end system node; and
at least one metric related to the at least one adjacent TTZ node that is the end system node.

20. The network node of claim 15, wherein the processor is further configured to initiate distribution to all TTZ nodes adjacent to the network node of the TTZ-related TLV with the third indicator set to indicate that migration to the ISIS TTZ is to occur.

21. A non-transitory computer-readable medium storing computer instructions for establishing an intermediate-system-to-intermediate-system (ISIS) topology-transparent-zone (TTZ), that when executed by one or more processors, cause the one or more processors to perform the steps of:

receiving an identifier of the ISIS TTZ to which an edge network node has been assigned;

receiving and storing ISIS TTZ topology information;

receiving a command to distribute the ISIS TTZ topology information to other network nodes assigned to the ISIS TTZ;

generating a TTZ-related type-length-value (TLV) and setting an indicator in the TTZ-related TLV to indicate that topology information related to the ISIS TTZ is to be distributed;

adding the TTZ-related TLV to a link state protocol data unit (LSP) that is to be transmitted by the edge network node; and distributing the LSP to all TTZ nodes adjacent to the edge network node.

22. A non-transitory computer-readable medium storing computer instructions for establishing an intermediate-system-to-intermediate-system (ISIS) topology-transparent-zone (TTZ), that when executed by one or more processors, cause the one or more processors to perform the steps of:

receiving an identifier of the ISIS TTZ to which an internal network node has been assigned;

receiving from another node a first link state protocol data unit (LSP) with a first TTZ-related type-length-value (TLV) containing an indication that topology information related to the ISIS TTZ is to be distributed, wherein the first TTZ-related TLV further contains topology information related to the other node;

distributing the first LSP to adjacent TTZ nodes of the internal network except for the adjacent TTZ node from which the first LSP is received;

generating a second LSP and adding a second TTZ-related TLV to the second LSP, wherein the second TTZ-related TLV does not contain topology information related to the internal network; and distributing the second LSP to all TTZ nodes adjacent to the internal network node.

* * * * *